Figure 1:
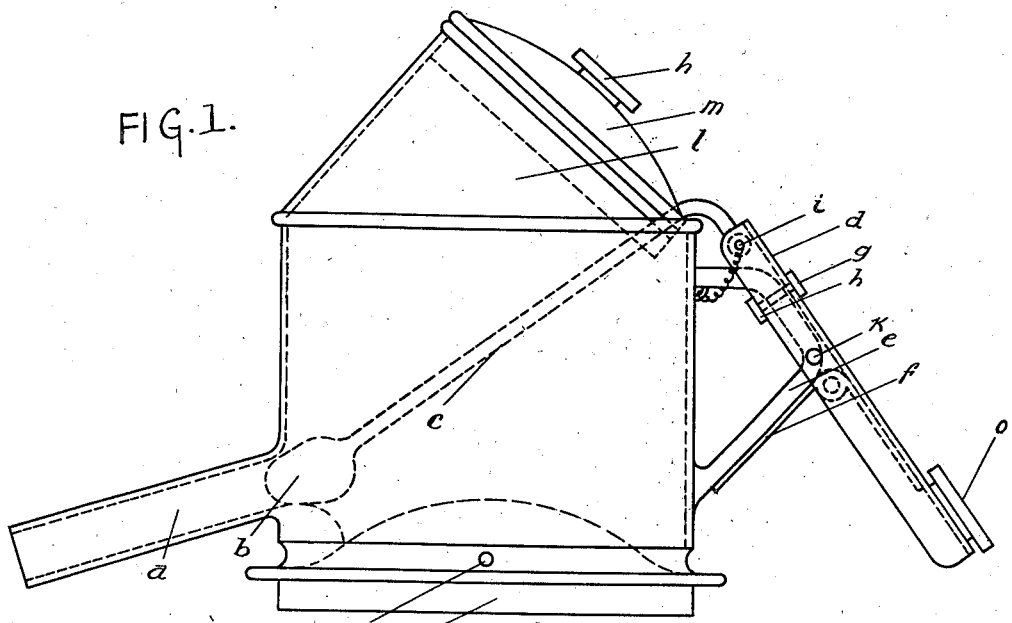

March 16, 1937.    S. McMAHON    2,074,230
COFFEEPOT
Filed Nov. 29, 1935

Samuel McMahon
by his attorneys
Howson and Howson

Patented Mar. 16, 1937

2,074,230

UNITED STATES PATENT OFFICE 2,074,230

COFFEEPOT

Samuel McMahon, Durban, Natal, Union of South Africa

Application November 29, 1935, Serial No. 52,227
In Union of South Africa January 31, 1935

2 Claims. (Cl. 53—3)

This invention relates primarily to coffee percolators which term is intended to include coffee pots and the like and has for its object the provision of a means for heating coffee and milk separately in the same unit. A further object of the invention is to enable the two liquids when thus heated, to be poured from the container in proportions which may be regulated.

While there are many known apparatus for the preparation of coffee in a pot in such a manner as to allow coffee when so prepared to be poured free of grains without any preliminary sifting, no satisfactory means has yet been discovered whereby milk may be heated simultaneously with, yet separately from, the coffee and whereby the milk and coffee ready for consumption may be poured from the same container in which they are prepared simultaneously in proportions which may be regulated.

The invention consists in the combination with a coffee percolator of any known type, of a receptacle in which milk may be heated by the rising stream in the percolator and from which the flow of milk may be regulated. To the top of the percolator a suitably shaped vessel into which milk may be poured is secured, either by means of a rim or in any other known manner. The boiling coffee rising in the coffee-pot heats the milk in the container to approximately 180° Fahrenheit i. e. to scalding point. Near the lower end of the milk container is attached a spout which converges towards the spout of the percolator so that both milk and coffee may flow simultaneously into even a very small receptacle. The inside end of the spout of the milk container is bevelled and the bevelled edge forms the seating of an olive-shaped plunger connected to a bent rod passing through a slot in the lid. The outer end of the rod is attached to a lever acting about a fulcrum consisting of a bracket attached to the side of the vessel. The position of the lever, rod and plunger is maintained by a spring. By depressing the lever the plunger is raised from its seat on the inner edge of the spout thus allowing the milk to flow. If the pot is tilted so as to allow coffee to flow out of the percolator and the lever depressed, milk and coffee will flow out simultaneously. The flow of milk may be regulated by raising or depressing the lever while the flow of coffee is regulated by the angle at which the whole apparatus is tilted.

In this way the milk is heated as in a double saucepan and does not boil over and there is no danger when the apparatus is left unattended. Moreover, the vitamins in the milk are not destroyed and no coagulum is formed. Since the spout is at the lowest level of the container the milk will flow on depressing the lever even if the whole apparatus is upright. The milk may thus be drawn if desired without coffee. Similarly if the apparatus is tilted without depressing the lever coffee may be poured without drawing milk.

Figure 2:
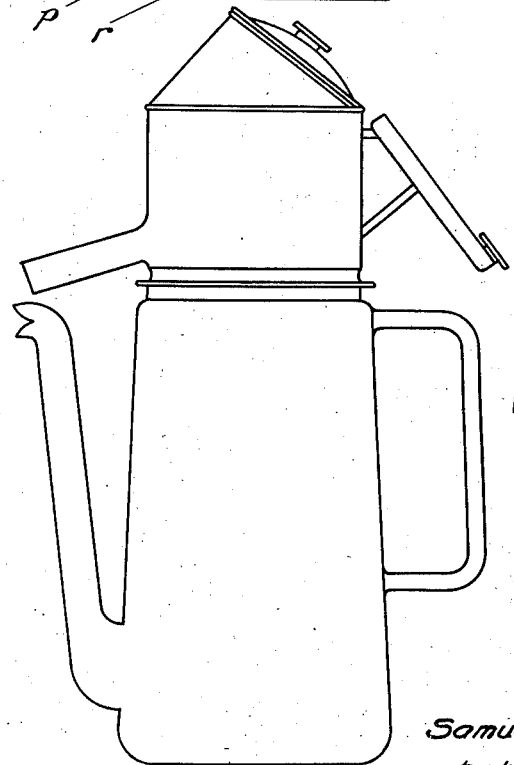

The invention will now be more particularly described with reference to the accompanying drawing. Figure 1 is a side elevation of the milk container while Figure 2 shows the milk container in position in combination with a coffee percolator. In Figure 1, $a$ is an outlet tube with a bevelled edge at its inner end. $b$ is the olive-shaped plunger connected by means of a bent rod $c$ to the lever $d$ and fitting with said bevelled edge to form a liquid-tight valve-joint. $e$ is a bracket which acts as a fulcrum to the lever and $f$ is a spring which maintains the lever, rod and plunger in position, so that the outlet pipe is normally closed. $g$ is a pin affixed to the lever and moving through a hole in the bracket which prevents excessive movement of the lever by means of two lock-nuts $h$ fitted to the bottom end of the pin. $i$ is a detachable split pin whereby the rod is attached to the lever. The lever is fastened to the bracket by means of a small rod $k$ passing through both these constituent parts. The lever is fitted with a small button $o$ to enable pressure to be exerted comfortably. The container has a raised edge $l$ set at an angle to prevent the overflow of the milk when it is tilted forward, $m$ is the lid to which is attached a small knob $n$ to facilitate removal and replacement of the lid. Two ventilation holes $p$ permit steam to escape from the percolator. From the foregoing it may be observed that milk alone may be discharged from the utensil by opening the valve, due to the fact the spout $a$ comes from the bottom part of the upper container. Alternatively, the valve may remain closed and the utensil tilted, whereby only coffee from the lower container will be discharged.

In the example illustrated the milk container is attached to the percolator by means of a rim $r$ which fits around the upper edge of the percolator but the invention is not restricted to this method of attachment. Similarly the method of attaching the rod to the lever may be varied so as to employ any known means but the method shown facilitates the dis-assembling of the apparatus for cleaning purposes. A spring may alternatively be placed on the side of the rod $k$ other than that shown in the drawing so as to act by extension instead of by compression, although in Figure 2 the openings of the two spouts are shown one above the other for the sake of clearness, it is frequently more advantageous for the openings to be arranged closely side by side in the same horizontal plane.

Many modifications within the scope of my invention will occur to those skilled in the art, therefore I do not limit the invention to the exact form as described and illustrated.

What I claim is:—

1. A cooking utensil comprising a lower container and an upper container seated upon said lower container in such a manner that the upper is heated by the heat from the lower in the manner of a double sauce pan, said containers having separate spouts whose ends are adjacent, said upper container having a top opening and a cover therefor, said opening and cover being inclined away from said spouts to prevent loss of liquid as the utensil is tilted.

2. A cooking utensil comprising a lower container and an upper container seated upon said lower container in such a manner that the upper is heated by the heat from the lower in the manner of a double sauce pan, said containers having separate spouts whose ends are adjacent, both spouts being exterior of both containers, a handle for tilting said utensil, valve means controlling the flow thru said upper spout, a bracket on said upper utensil, manual control means for said valve means pivoted on said bracket and positioned for manipulation while said utensil is being tilted.

SAMUEL McMAHON.